(12) United States Patent
Kimura (10) Patent No.: US 8,253,978 B2
(45) Date of Patent: Aug. 28, 2012

(54) IMAGE PROCESSING APPARATUS AND IMAGE FORMING APPARATUS

(75) Inventor: Shinichi Kimura, Osaka (JP)

(73) Assignee: Kyocera Mita Corporation (JP)

(*) Notice: Subject to any disclaimer, the term of this patent is extended or adjusted under 35 U.S.C. 154(b) by 776 days.

(21) Appl. No.: 12/465,710

(22) Filed: May 14, 2009

(65) Prior Publication Data
US 2009/0290179 A1    Nov. 26, 2009

(30) Foreign Application Priority Data
May 20, 2008  (JP) ................................ 2008-131860

(51) Int. Cl.
*H04N 1/60* (2006.01)
*H04N 1/46* (2006.01)
*H04N 1/40* (2006.01)
*H04N 1/405* (2006.01)

(52) U.S. Cl. ......... 358/1.9; 358/500; 358/445; 358/505; 358/3.06

(58) Field of Classification Search ........................ None
See application file for complete search history.

(56) References Cited

U.S. PATENT DOCUMENTS

| | | | | |
|---|---|---|---|---|
| 5,032,904 A | * | 7/1991 | Murai et al. | 358/500 |
| 6,538,769 B2 | * | 3/2003 | Takemoto et al. | 358/1.9 |
| 7,599,078 B2 | * | 10/2009 | Sano | 358/1.13 |
| 2006/0044576 A1 | * | 3/2006 | Tabata et al. | 358/1.9 |
| 2006/0055947 A1 | * | 3/2006 | Tanaka | 358/1.9 |
| 2007/0285733 A1 | * | 12/2007 | Sadowara | 358/445 |
| 2009/0034005 A1 | * | 2/2009 | Gotoh | 358/3.06 |
| 2009/0073516 A1 | * | 3/2009 | Tanaka | 358/505 |

FOREIGN PATENT DOCUMENTS

JP    10-341341    12/1998

* cited by examiner

*Primary Examiner* — Satwant Singh
(74) *Attorney, Agent, or Firm* — Gerald E. Hespos; Michael J. Porco (57) ABSTRACT

An image processing apparatus includes an image forming instructing section that notifies an image forming section, whether to perform a first printing processing with a plurality of colors including at least one chromatic color or a second printing processing with only black. A data obtaining section obtains pixel data from a plurality of pixels constituting an image; and an operating section inputs designated color data. A pixel data extracting section extracts pixel data of colors, except for a designated color indicated by the designated color data inputted through the operating section, from pixel data obtained by the data obtaining section. A printing type selecting section selects the first or second printing processing based on each pixel data extracted by the pixel data extracting section. The image forming instructing section notifies the printing type selected by the printing type selecting section as the type of printing processing to be performed.

8 Claims, 8 Drawing Sheets

IMAGE PROCESSING APPARATUS AND IMAGE FORMING APPARATUS

BACKGROUND OF THE INVENTION

1. Field of the Invention

The present invention relates to the field of image forming apparatuses. More particularly, it relates to the technical field of the ACS (Auto Color Selection) processing for determining whether or not a document is a color image.

2. Description of the Related Art

Conventionally, in color digital copying machines, there has been adopted a technology of using the ACS (Auto Color Selection) processing to automatically determine whether an image of each page read by an image reading section is a color image. According to this technology, color printing (first printing processing) is performed if it is determined that the image is a color image, or monochromatic printing (second printing processing) is performed if it is determined that the image is not a color image.

However, according to this kind of technology, for example, if a base of a document is colored like a colored paper and the like, the color of the base may cause the document to be determined as a colored document, so that the color of the base portion is reproduced in image forming. For example, if a character or drawing is depicted in black on a document having a chromatic base, and an area of the base portion is relatively large, a situation may arise where the base portion may cause color printing to be performed although a user thinks it is acceptable to perform monochromatic printing. If it is disadvantageous for a user, color toner is wasted.

SUMMARY OF THE INVENTION

An object of the present invention is to provide an image processing apparatus and an image forming apparatus which are capable of easily executing the ACS processing in a manner desired by a user as possible.

An image processing apparatus in accordance with an aspect of the present invention includes: an image forming instructing section which notifies an image forming section, which is capable of performing a first printing processing of performing image forming with use of a plurality of colors including at least one chromatic color and a second printing processing of performing image forming with use of only black color, a printing type processing requested to be performed among the first printing processing and the second printing processing; a data obtaining section which obtains pixel data from a plurality of pixels constituting an image; an operating section for inputting designated color data indicating color; a pixel data extracting section which extracts pixel data of colors, except for a designated color indicated by the designated color data inputted through the operating section, from pixel data obtained by the data obtaining section; and a printing type selecting section which selects a printing type from among the first printing processing and the second printing processing based on each pixel data extracted by the pixel data extracting section. The image forming instructing section notifies the printing type selected by the printing type selecting section as the type of printing processing requested to be performed.

According to this configuration, there are provided an operating section for inputting designated color data indicating color, a pixel data extracting section which extracts pixel data of colors except for a designated color indicated by the designated color data inputted through the operating section, from pixel data obtained by the data obtaining section, and a printing type selecting section which selects a printing type from among the first printing processing and the second printing processing based on each pixel data extracted by the pixel data extracting section, and the image forming instructing section notifies the printing type selected by the printing type selecting section as the type of printing processing requested to be performed. Accordingly, in the event of determining a printing type based on each pixel data, a user can select a color which is not to be included in the subject of the determination. Consequently, it becomes easy to execute the selection processing in a manner desired by a user.

Further, according to another aspect of the present invention, an image forming apparatus includes: the image processing apparatus mentioned above; and an image forming section which performs image forming operation in accordance with a type of the printing processing notified by the image forming instructing section.

According to this configuration, the effect mentioned above can be achieved in an image forming apparatus capable of performing first printing of performing image forming with use of a plurality of colors including at least one chromatic color and second printing of performing image forming with use of only black color.

These and other objects, features and advantages of the present invention will become more apparent upon reading of the following detailed description along with the accompanied drawings.

DETAILED DESCRIPTION OF THE PREFERRED EMBODIMENTS

Figure 1:
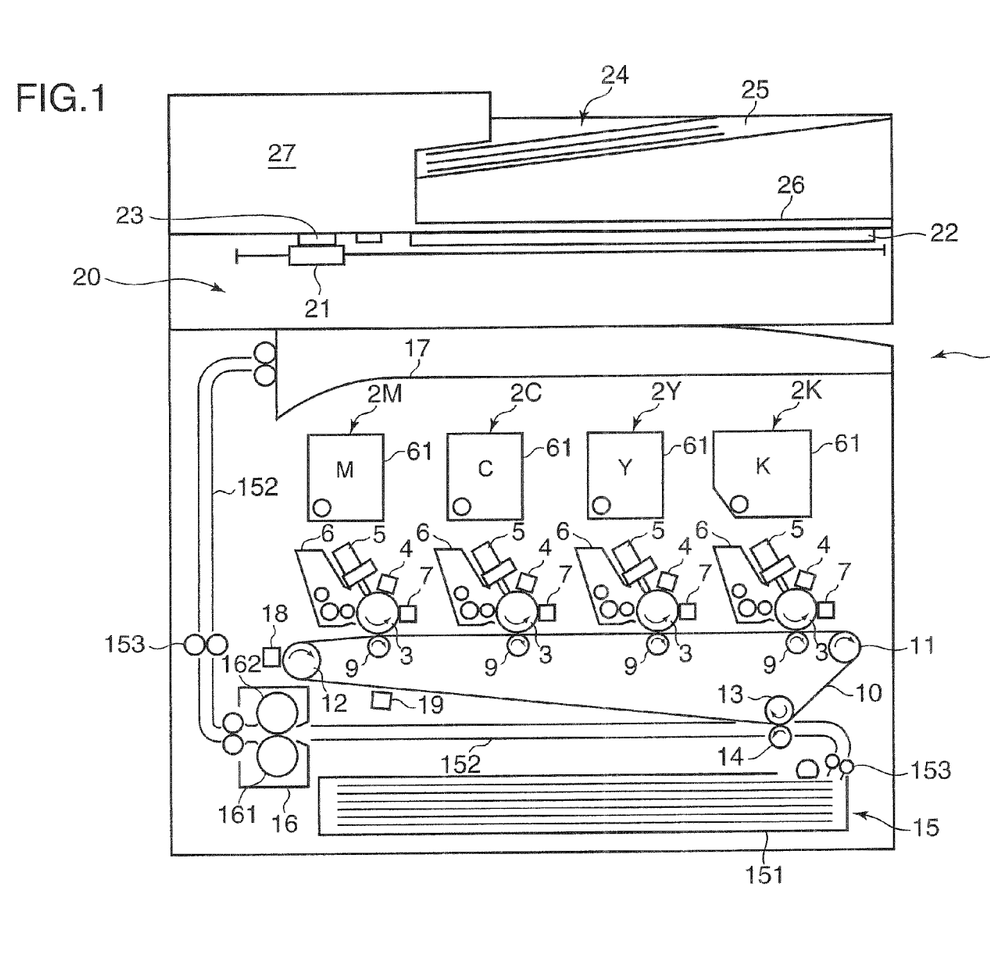
FIG. 1 schematically shows a configuration of a copying machine in accordance with an embodiment of the present invention.

Hereinafter, a copying machine as an example of an image forming apparatus in accordance with an embodiment of the present invention will be described with reference to the drawings. FIG. 1 schematically shows a configuration of the copying machine in accordance with the embodiment of the present invention. As shown in FIG. 1, in a main body of the copying machine 1, there are provided image forming sections 2M, 2C, 2Y, 2K for respective colors of magenta (M), cyan (C), yellow (Y), and black (K) arranged side by side.

The image forming sections 2M, 2C, 2Y, and 2K (these are collectively referred to as "image forming section 2" hereinafter) are adapted to form (print) an image on a sheet. Further, the image forming section 2 is capable of performing color printing with use of the image forming sections 2M, 2C, 2Y, and 2K and monochromatic printing with use of only the image forming section 2K. Each of the image forming sections 2M, 2C, 2Y, and 2K includes a photosensitive drum 3 made of, for example, amorphous silicon, and a charging device 4, an exposure section 5, a developing section 6, and a cleaning section 7, which are provided in periphery of the photosensitive drum 3. The copying machine 1 according to the present embodiment includes the image forming section which is adapted to form a black (K) image. However, not limited to this, it may be so configured that the image forming section 2K the image forming section 2 is omitted from the image forming section 2, and the image forming sections 2M, 2C, and 2Y may form a black (K) image by superimposing the colors of magenta (M), cyan (C), and yellow (Y).

The charging device 4 is adapted to evenly charge a surface of the photosensitive drum 3 at a predetermined electric potential. The exposure section 5 irradiates a laser beam (LED light), which is generated based on image data transmitted from an image data storage 40 (refer to FIG. 2) which will be described later, to the surface of the photosensitive drum 3 to form an electrostatic latent image on the drum surface. The developing section 6 allows toner fed by the toner feeding section 61 to be adhered to the electrostatic latent image formed on the photosensitive drum 3 to allow the electrostatic latent image to appear as a toner image. The cleaning section 7 is adapted to clean the toner on the surface of the photosensitive drum 3 after a toner image is primarily transferred to an intermediate belt 10 which will be described later is terminated.

Under the image forming sections 2M-2K, there are provided intermediate transferring rollers 9 (primary transferring rollers) and the intermediate belt (intermediate transferring belt) 10 which are adapted to perform intermediate transfer (primary transfer) of the toner image which appears on the surface of the photosensitive drum 3. The intermediate belt 10 is made up of a predetermined belt member, and it is so configured as to be rotated endlessly by driving rollers 11-13 in a state of being pressed against the photosensitive drums 3 by the intermediate transferring rollers 9 which are so arranged as to face respectively to the photosensitive drums 3. The toner images of respective colors formed on the photosensitive drums 3 are superimposed onto the endlessly rotated intermediate belt 10 at suitable timings in the order of magenta, cyan, yellow, and black. This allows a color image consisting of four colors of Y, M, C, and K to be formed on the intermediate belt 10.

At a position facing the driving roller 13, there is provided a secondary transferring roller 14 through the intermediate belt 10. The secondary transferring roller 14 is adapted to transfer the color image on the intermediate belt 10 to the sheet by means of a transfer bias from a controller 33 (refer to FIG. 2) which will be described later.

Further, the copying machine 1 is provided with a sheet-feeding section 15 which is adapted to feed a sheet to the image forming sections 2Y-2K. The sheet-feeding section 15 includes a sheet-feeding cassette 151 storing a sheet of a respective size, a conveying passage 152 which is a passage for conveying the sheet, a conveying roller 153 for conveying the sheet through the conveying passage 152, and the like, and conveys a sheet taken out one after another from the sheet-feeding cassette 15 to the image forming sections 2Y-2K, in other words, to the position of the secondary transferring roller 14. The sheet-feeding section 15 conveys the sheet applied with the secondary transfer processing to a fixing section 16, and discharges the sheet applied with the fixing processing to a sheet-discharging tray 17 formed on top of the main body of the copying machine.

At a suitable portion on a downstream side from the secondary transferring roller 14 in the conveying passage 152, there is provided the fixing section 16. The fixing section 16 is adapted to fix the toner image transferred on the sheet. The fixing section 16 includes a heating roller 161 and a pressing roller 162. The heating roller 161 applies heat to melt toner on the sheet, and the pressing roller 162 applies pressure to fix the toner on the sheet.

Further, the copying machine 1 includes a charge-removal cleaning section 18 and a density sensor 19. The charge-removal cleaning section 18 is adapted to remove (collect) toner (remaining toner) from the intermediate belt 10. The charge-removal cleaning section 18 includes a cleaning electrode and a cleaning brush (rotation brush), which are not illustrated. The cleaning electrode applies cleaning bias having polarity opposite to that of the electric charge of the toner to the cleaning brush. The static electricity generated by this causes the toner on the intermediate belt 10 to the cleaning brush to remove toner.

The density sensor 19 is adapted to measure the density on the surface of the intermediate belt 10 (hereinafter, suitably referred to as "belt surface").

In an upper portion of the main body of the copying machine 1, there are provided a document reading section 20 and a document feeding section 24. The document reading section 20 includes a scanner portion 21 constituted by a CCD (Charge Coupled Device) sensor having a plurality of pixels, an exposure lamp, and the like, and a document holder 22 constituted by a transparent member such as glass, and a document reading slit 23. The scanner portion 21 is so configured as to be movable by an unillustrated driving section. When reading a document placed on the document holder 22, the scanner portion 21 moves along the document surface at a position facing the document holder 22 and outputs image data obtained by scanning a document image (each pixel data) to the controller 33 (refer to FIG. 2). Further, when reading a document fed by the document feeding section 24, the scanner portion 21 moves to a position facing the document reading slit 23, and obtains a document image through the document reading slit 23 in synchronism with the document conveying operation performed by the document feeding section 24, and then outputs the image data to the controller 33.

The document feeding section 24 includes a document holding portion 25 for holding a document, a document discharging portion 26 for discharging a document whose image is read, and a document conveying mechanism 27 having a sheet-feeding roller, a conveying roller (not illustrated) and the like for conveying the document placed on the document holding portion 25 one after another to the position facing the document reading slit 23 and discharging the document to the document discharging portion 26. The document conveying mechanism 27 is further provided with a sheet reversing mechanism (not illustrated) adapted to reverse front and back of the document and convey the document again to the position facing the document reading slit 23, so that images on opposite sides of the document can be read by the scanner portion 21 through the document reading slit 23.

Further, the document feeding section 24 is so provided as to be rotatable with respect to the main body 2 so that a front side thereof can move upward. By moving the front side of the document feeding section 24 upward to open the upper side of the document holder 22, a user can place a document to be read such as an opened book on an upper surface of the document holder 22.

Figure 2:
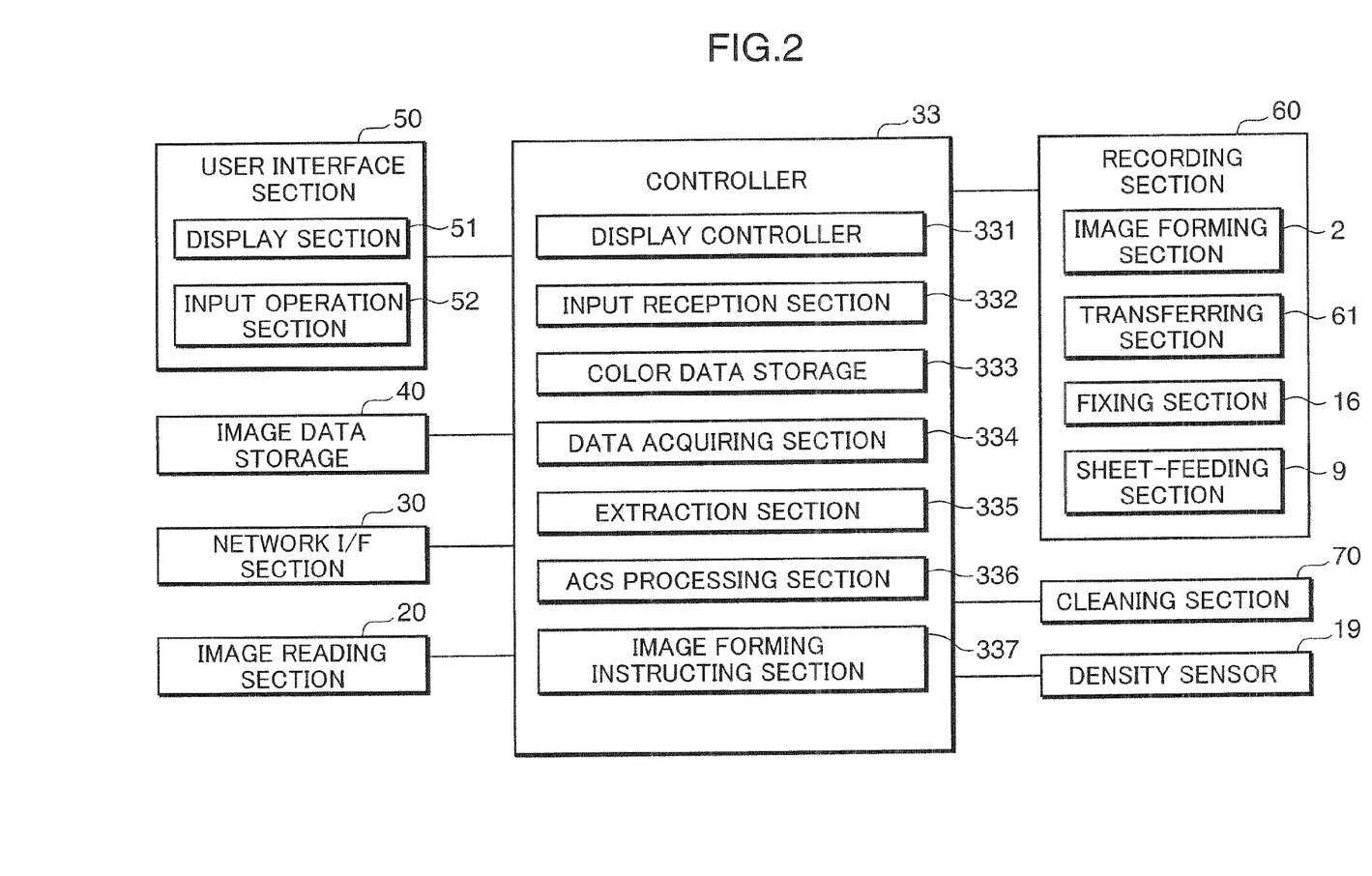
FIG. 2 is a block diagram showing an example of a schematic configuration of the copying machine.

FIG. 2 is a block diagram showing an example of a schematic configuration of the copying machine 1. As shown in FIG. 2, the copying machine 1 includes a network I/F (interface) section 30, an image data storage 40, a user interface section 50, a recording section 60, a cleaning section 70, a density sensor 19, and the controller 33. It should be understood that the components which are the same as those shown in FIG. 1 are identified by the same reference numerals, and description regarding those will be omitted.

The network I/F section 30 is adapted to control various data transmission with an information processing apparatus (external apparatus) such as a PC connected through a network such as a LAN. The image data storage 40 temporarily stores image data transmitted from a PC or the like through the network I/F section 30. The user interface section 50 is provided on a front portion of the copying machine 1 and includes a display section 51 for displaying predetermined information and an input operation section 52 (operating section) which allows a user to perform various input operations. The display section 51 is formed integrally with a touch panel constituting the input operation section 52. The touch panel detects a touched position when a user performs a touching operation, and outputs a detection signal indicating the touched position to the controller 33 which will be described later.

The recording section 60 includes the image forming section 2, the transferring section 61, the fixing section 16, and the sheet-feeding section 9, and is adapted to performing image printing with respect to a sheet based on image stored in the image data storage 40. The transferring section 61 includes the above-described intermediate belt 10, the driving rollers 11-13, and the secondary transferring roller 14, and is adapted to transfer the toner image on the photosensitive drum 3 to the sheet through the intermediate belt 10.

The controller 33 includes a ROM (Read Only Memory) for storing various control programs, a RAM (Random Access Memory) serving a function of temporarily storing data and a function as a working area, and a microcomputer for reading the control program and the like from the ROM and executing the same. The controller 33 performs transmission of various control signals with respect to the functional portions and totally control the copying machine 1.

Figure 3:
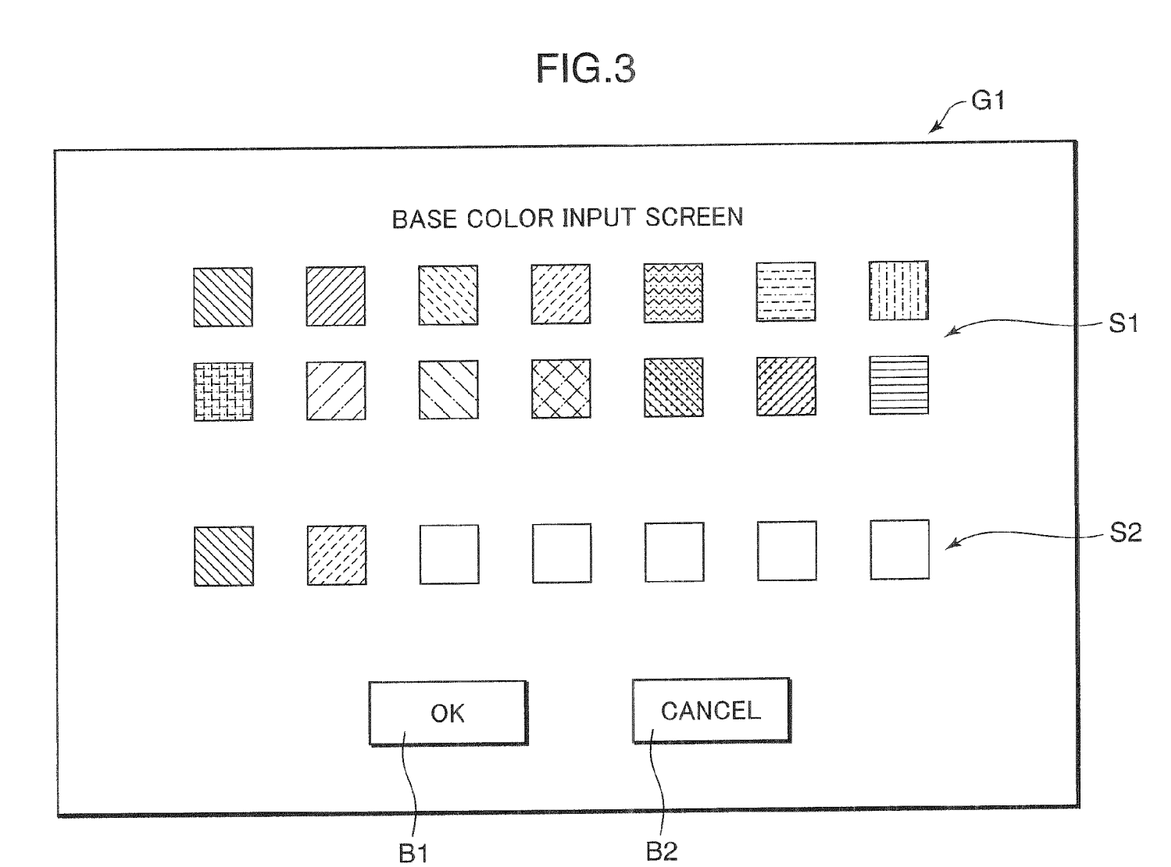
FIG. 3 shows an example of a base color input screen.

The copying machine 1 has a function of executing the ACS processing for determining if a document image is a color image or a monochromatic image. However, in the present embodiment, taking in consideration the case where a base portion Q of a document is colored, and there may exists a user who would like to exclude pixel data of the base portion from the subject of the ACS processing (who would like to avoid the situation where the base portion affects a result of the determination of the ACS processing), there are provided a function for inputting to the copying machine 1 a color to be excluded from the subject of the ACS processing (designated color) through, for example, a base color input screen G1, which will be described later, as shown in FIG. 3, and a function for excluding pixels having the inputted color from elements subjected to the determination by the ACS processing. This point is different from the conventional technologies.

To realize these functions, the controller 33 functionally includes a display controller 331, an input reception section 332, a color data storage 333, a data obtaining section 334, an extraction section 335 (pixel data extracting section), an ACS processing section 336 (printing type selecting section), and an image forming instructing section 337.

If a predetermined operation corresponding to an instruction of displaying the base color input screen G1 is performed with respect to the input operation section 52, the display controller 331 controls the display section 51 to display, for example, the base color input screen G1 as shown in FIG. 3. FIG. 3 shows an example of the base color input screen G1.

The base color input screen G1 is a screen which is adapted to input selection of a color to be excluded from the subject of the ACS processing (designated color). The base color input screen G1 shown in FIG. 3 includes a display area S1, a display area S2, an "OK" button B1, and a "cancel" button B2. In the display area S1, a plurality of boxes having different colors (selection candidate colors) are arranged in a form of predetermined arrangement (for example, in a matrix form) in a selectable manner. In the display area S2, a plurality of boxes which can be switched between a colored state and a colorless state are arranged in a form of predetermined arrangement (for example, in a row).

The copying machine 1 is so configured that designation of the box in the display area S1 can be inputted with use of the input operation section 52 in the base color input screen G1. If a user performs an input operation of designating the box, the display controller 331 temporarily sets a color of the box, among colors of the document image, as the designated color requested to be excluded from the subject of the ACS processing, and sets data indicating the designated color as designated color data. Then, to visually present the designated color which is temporarily set as a color to be excluded from the subject of the ACS processing, the display controller 331 switches one of the plurality of boxes in the display area S2 from the colorless state to the colored state of the designated color (temporarily set color) at each time when one color is designated. In the present embodiment, a plurality of colors can be designated as the designated color to be excluded from the subject of the ACS processing. However, it may be so configured that only one designated color can be designated. In FIG. 3, the difference in colors are presented by various kinds of hatching applied to the boxes.

For example, the number of boxes in the display area S2 may be fixedly set to be easily recognized number in advance taking in consideration the limitation in size of the display screen, or the number of boxes may be increased or decreased as needed.

Further, if a box in the display area S1 in the input operation section 52 is newly touched, and only if the selection candidate color indicated by the touched box is different from a color already displayed by any box in the display area S2, the display controller 331 may control a colorless box in the display area S2 to display the selection candidate color as a new temporarily set color.

Accordingly, the number of boxes in the display area S2 is fixedly set in advance, so that it can prevent display of the same colors in duplicate in the display area S2 causing reduction in kinds of colors which can be set as the designated color.

The "OK" button B1 is a button for inputting a fixing instruction of shifting the temporarily set state of color to the fixedly set state. If an operation is performed with respect to the "OK" button B1, the display controller 331 in the copying machine 1 formally sets (fixedly sets) the color of the box in the colored state among the boxes in the display area S2 as the designated color to be excluded from the subject of the ACS processing. The "cancel" button B2 is a button for inputting an instruction of releasing the temporarily set state of the designated color. If an operation is performed with respect to the "cancel" button B2, the display controller 331 in the copying machine 1 switches the box in the colored state among the boxes in the display area S2 to the colorless state and sets the state to be an initial state before temporarily setting the designated color.

The input reception section 332 is adapted to receive data indicating the designated color which is fixedly set in the base color input screen G1 (hereinafter, referred to as "designated color data") from the input operation section 52. The color data storage 333 is adapted to store the designated color data received by the input reception section 332. The data obtaining section 334 is adapted to obtain pixel data acquired by the reading operation performed by the document reading section 20.

The extraction section 335 determines whether each pixel data obtained by the data obtaining section 334 is the same as or close to the designated color data stored in the color data storage 333, and extracts only the pixel data which is neither the same as nor close to the designated color data stored in the color data storage 333 as the subject of the determining processing of the ACS processing.

For example, color expression is performed based on the three primary colors of R (red), G (green), and B (blue), and the intensity of each reference color component is expressed with the values between 0-255. Further, colors are expressed in the form of (value indicating the intensity of R (red), value indicating the intensity of G (green), value indicating the intensity of B (blue)), and white is expressed as (255,255,255).

In this case, it is assumed that there is a color expressed by (R1, G1, B1) as one of the colors in the boxes displayed in the display area S1 of the base color input screen G1, and this color is designated. In this instance, the extraction section 335 sets predetermined ranges respectively for reference color components based on the values R1, G1, B1 of the reference color components constituting the designated color.

$$(R_1-\alpha_1) < R_1 < (R_1+\alpha_2) \quad (1)$$

$$(G_1-\beta_1) < G_1 < (G_1+\beta_2) \quad (2)$$

$$(B_1-\gamma_1) < B_1 < (B_1+\gamma_2) \quad (3)$$

As to $\alpha_1$, $\alpha_2$, $\beta_1$, $\beta_2$, $\gamma_1$, $\gamma_2$, it may be so set as to be $\alpha_1=\alpha_2\neq\beta_1=\beta_2\neq\gamma_1=\gamma_2$ or $\alpha_1=\alpha_2=\beta_1=\beta_2=\gamma_1=\gamma_2$, and it can be set in a suitable manner. Further, in the set ranges indicated by the formulas (1)-(3), if a lower limit becomes below 0, the lower limit is set to be 0. If an upper limit becomes over 255, the upper limit is set to be 255.

The extraction section 335 compares the intensities of the reference color components of the pixel data obtained by the data obtaining section 334 with the set ranges (1)-(3), and determines for each pixel whether the pixel data obtained by the data obtaining section 334 is pixel data in which the reference color component satisfies any one of the set ranges (1)-(3).

For example, as colors of the boxes displayed in the display area S1 of the base color input screen G1, there are provided red expressed by (255,0,0), green expressed by (0,255,0), blue expressed by (0,0,255), yellow expressed by (255,255,0), cyan expressed by (0,255,255), and magenta expressed by (255,0,255), and it is assumed that cyan expressed by (0,255,255) is designated.

At this time, for example, if it is so set that $\alpha_1=\alpha_2=\beta_1=\beta_2=\gamma_1=\gamma_2=10$, the extraction section 335 sets the following formulas.

As to reference color component of R(red), $0 < R_1 < 10$ (4),

As to reference color component of G(green), $245 < G_1 < 255$ (5),

As to reference color component of B(blue), $245 < B_1 < 255$ (6)

In this case, if a color of pixel data among image data obtained by the data obtaining section 334 is, for example, a color expressed by (50,250,60), the intensity of the reference color component of G (green) is included in the set range (5). Therefore, the extraction section 335 determines that the pixel data is pixel data having the intensity satisfying any one of the set ranges (4)-(6).

On the other hand, if a color of one pixel data among image data obtained by the data obtaining section 334 is, for example, a color expressed by (100,100,100), the intensity of none of the reference color components is included in the set ranges (4)-(6). Therefore, the extraction section 335 determines that the pixel data is not pixel data having the intensity satisfying any one of the set ranges (4)-(6).

If the pixel data obtained by the data obtaining section 334 matches with the color designated in the base color input screen G1 (designated color) in all of the reference color components, a color corresponding to the pixel data is the same as the color designated in the base color input screen G1. Further, if the pixel data obtained by the data obtaining section 334 does not match with the color designated in the base color input screen G1 (designated color) but has a reference color component having an intensity satisfying at least one of the set ranges (1)-(3), a color corresponding to the pixel data is close to the color designated in the base color input screen G1.

The extraction section 335 executes such determination and extracts pixel data other than pixel data having an intensity satisfying any one of the set ranges (1)-(3) from pixel data obtained by the data obtaining section 334.

Figure 7:
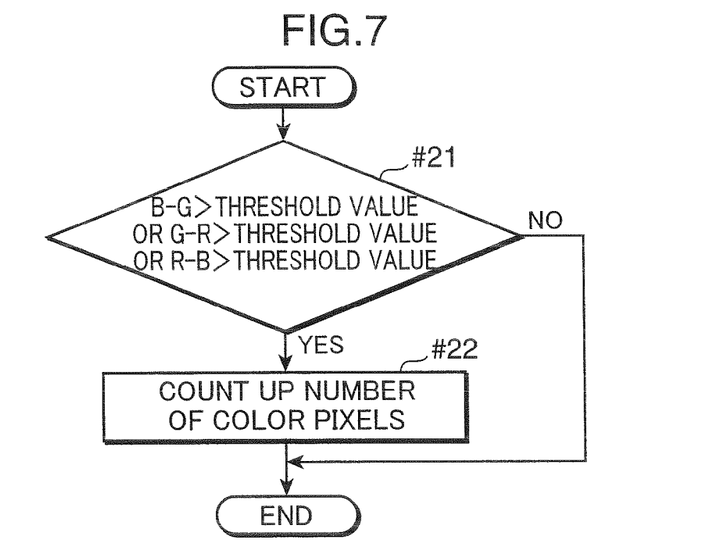
FIG. 7 is a flowchart showing the ACS processing executed by the ACS processing section.
Figure 8:
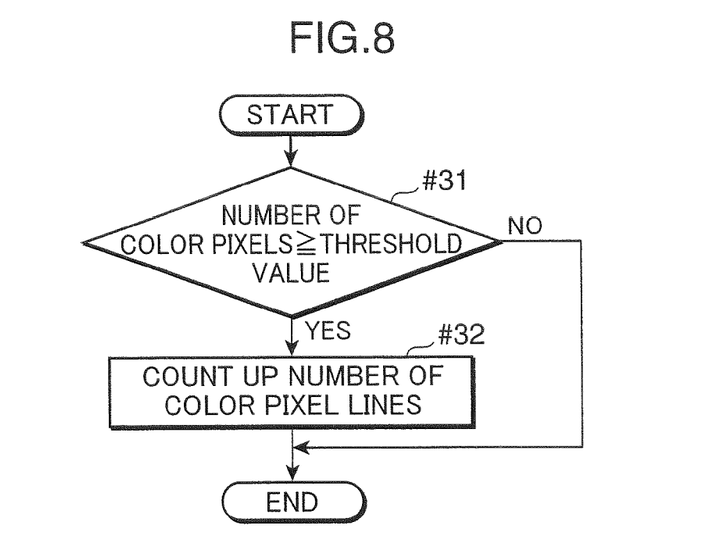
FIG. 8 is a flowchart showing the ACS processing executed by the ACS processing section.
Figure 9:
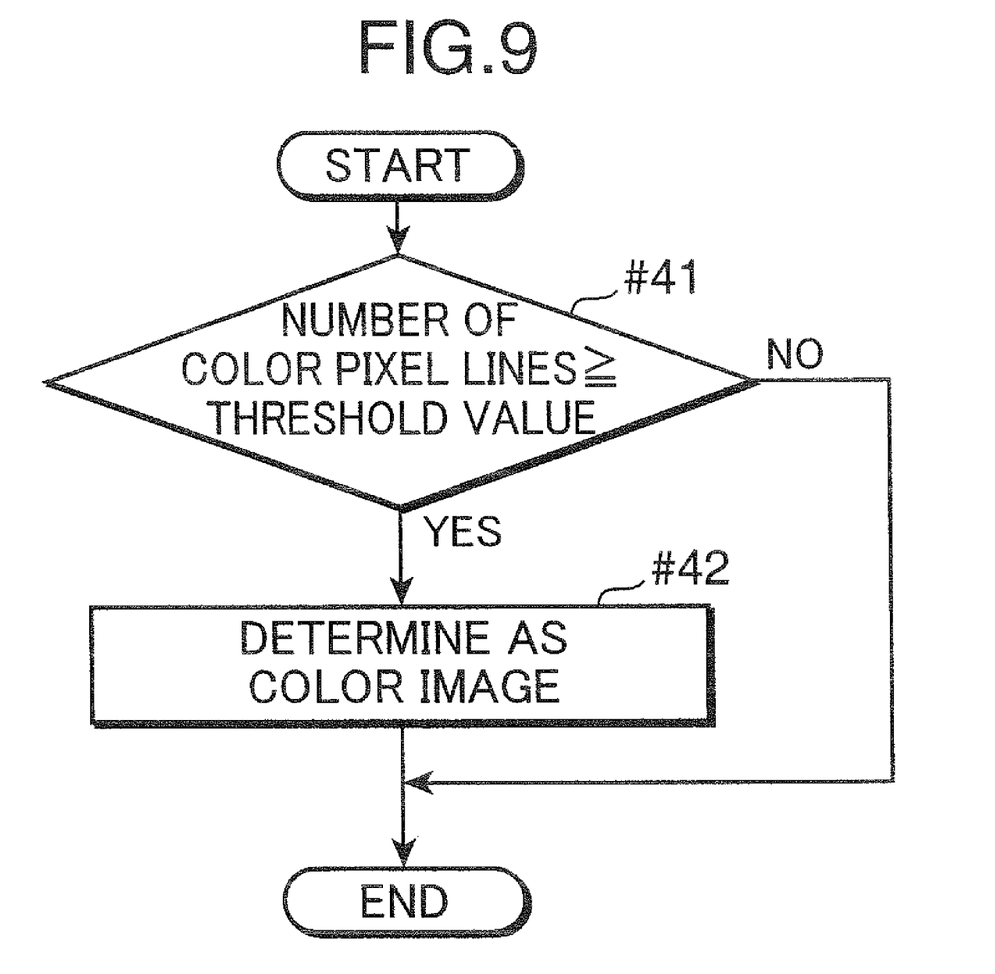
FIG. 9 is a flowchart showing the ACS processing executed by the ACS processing section.

The ACS processing section 336 corresponds to an example of the printing type selecting section and is adapted to execute the ACS processing shown in FIGS. 7-9 with respect to pixel data extracted by the extraction section 335. The ACS processing will be described later. The image forming instructing section 337 is adapted to notify the image forming section 2 which of the color printing and the monochromatic printing should be performed based on the determination result of the ACS processing section 336 to allow the image forming section 2 to perform image forming operation.

Figure 5:
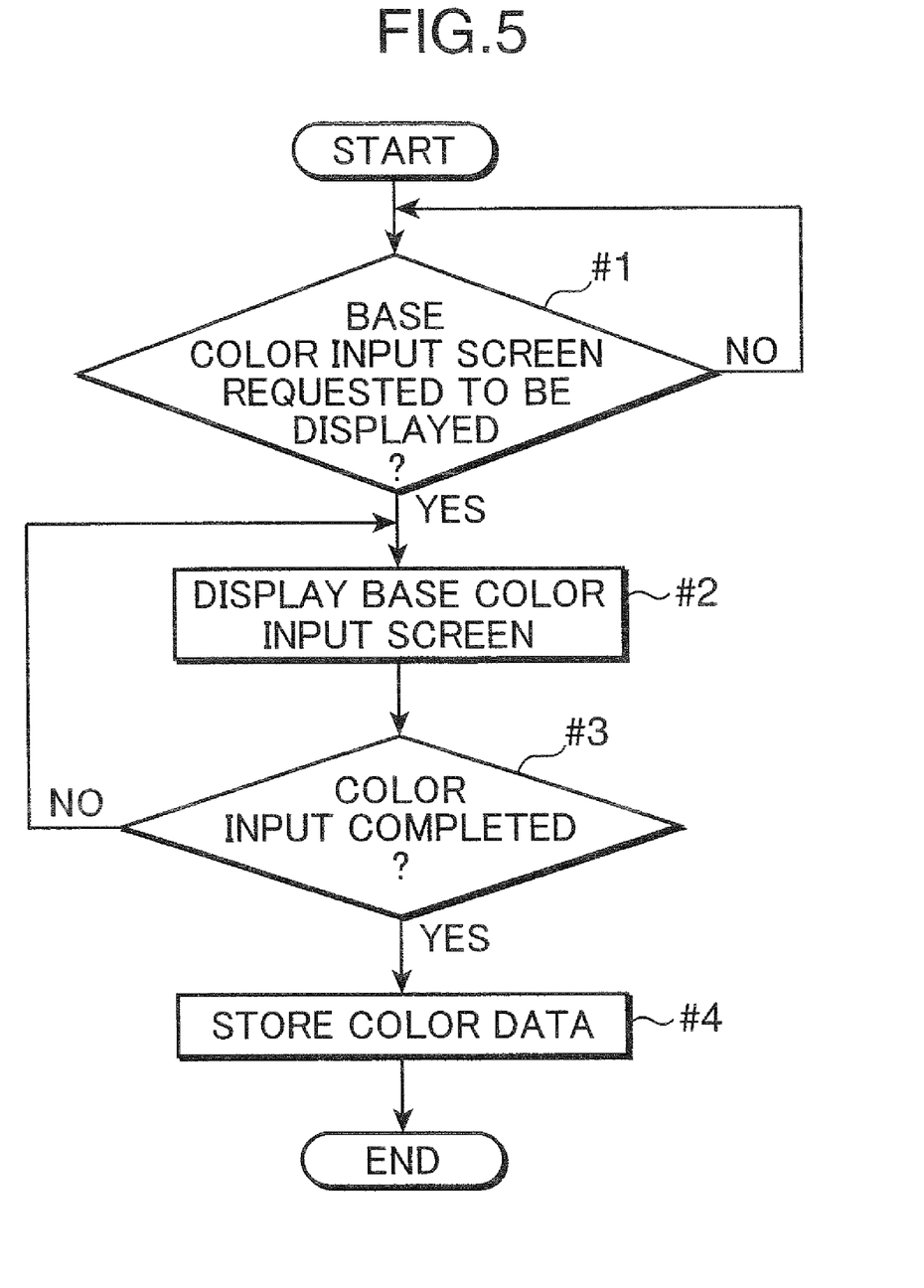
FIG. 5 is a flowchart showing setting processing for setting a color which is to be excluded from subject of the ACS processing.

FIG. 5 is a flowchart showing setting processing for setting a color which is to be excluded from the subject of the ACS processing.

As shown in FIG. 5, if a predetermined operation indicating a request for displaying the base color input screen G1 is preformed with respect to the user interface section 50 (YES in step #1), the display controller 331 displays the base color input screen G1 shown in FIG. 3 on the display section 51 (step #2). In the display area S1 of the base color input screen G1, if a color to be excluded from the subject of the ACS processing is touched and selected (YES in step #3), the color data storage 333 stores the designated color data indicating the selected color (designated color) (step #4).

Figure 6:
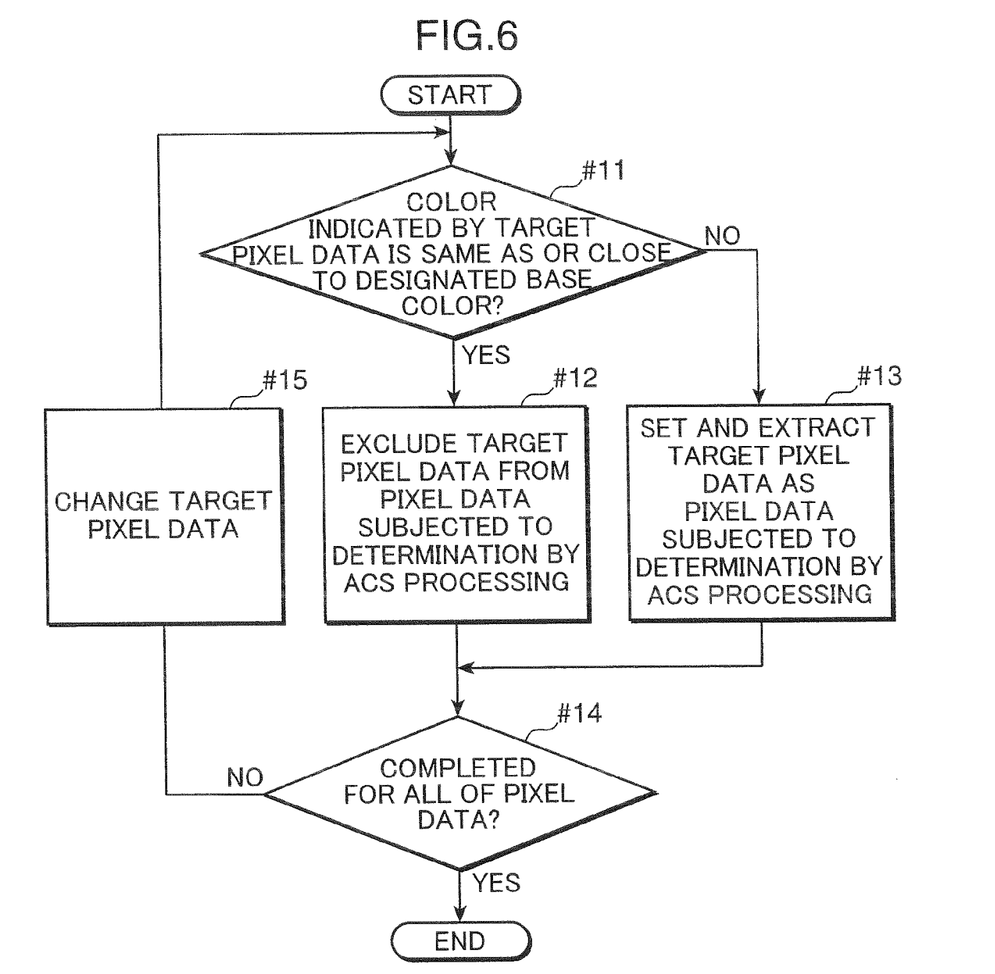
FIG. 6 is a flowchart showing extracting processing executed by an extraction section.

FIG. 6 is a flowchart showing extracting processing executed by the extraction section 335.

As shown in FIG. 6, the extraction section 335 sets one pixel data among pixel data obtained by the data obtaining section 334 as target pixel data, and determines whether the target pixel data is the same as or close to the designated color data stored in the color data storage 333 (whether a color indicated by the target pixel data is the same as or close to the color indicated by the designated color data stored in the color data storage 333) (step #11).

If the extraction section 335 determines that the target pixel data is the same as or close to the designated color data stored in the color data storage 333 (YES in step #11), it is so set that the target pixel data to be excluded from the subject of the determination processing of the ACS processing (step #12). On the other hand, if the extraction section 335 determines that the target pixel data is pixel data which is neither the same as nor close to the designated color data stored in the color data storage 333 (YES in step #11), it is so set that the target pixel data as the subject of the determination processing of the ACS processing and extracts the same (step #13).

Then, the extraction section 335 determines whether the processing of steps #11-#13 is completed for all of pixel data (step #14). If the processing is not completed (NO in step #14), the target pixel data is changed to other pixel data (step #15), and the processing of steps #11-#13 is executed with respect to the target pixel data. On the other hand, if the processing of steps #11-#13 is completed for all of pixel data (YES in step #14), the extracting processing is terminated.

FIGS. 7-9 are flowcharts showing an example of the ACS processing executed by the ACS processing section 336. The ACS processing section 336 executes the ACS processing shown in FIGS. 7-9 with respect to pixel data extracted by the extracting processing of the extraction section 335 as shown in FIG. 6.

As shown in FIG. 7, the ACS processing section 336 sets each pixel of pixel data extracted as the subject of the ACS processing by the extraction section 335 to be a target pixel sequentially. Showing a pixel value of the R (red) component of the target pixel as R, a pixel value of the G (green) component as G, and a pixel value of the B (blue) component as B, it is determine whether each target pixel satisfies at least one of the following conditions: a condition where the difference between the pixel value B and the pixel value G is greater than the predetermined threshold value; a condition where the difference between the pixel value G and the pixel value R is grater than the predetermined threshold value; and a condition where the difference between the pixel value R and the pixel value B is greater than the predetermined threshold value (step #21). If the condition is satisfied (YES in step #21), processing of counting the number of color pixels is executed by determining the target pixel as a color pixel and increasing the count value by one (step #22).

If the processing of steps #21 and #22 with respect to each pixel extracted as the subject of the ACS processing by the extraction section 335 is terminated, as shown in FIG. 8, the ACS processing section 336 focuses on a pixel line (pixel row) of the pixels corresponding to, for example, a main scanning line, and determines for each pixel line whether the number of color pixels belonging to the pixel line (color pixel line) is equal to or greater than a predetermined threshold value (step #31). If the number of color pixels belonging to the pixel line is equal to or greater than the predetermined threshold value (YES in step #31), processing of counting the number of color pixel lines is executed by determining the pixel line as a pixel line of color (color pixel line) and increasing the count value by one (step #32).

If the processing shown in FIG. 8 with respect to each pixel line is terminated, as shown in FIG. 9, the ACS processing section 336 determines whether the count value of color pixel lines of an image for one sheet obtained by the data obtaining section 334 (the number of color pixel lines) is equal to or greater than a predetermined threshold value (step #41). If the count value of color pixel lines in the image obtained by the data obtaining section 334 (the number of color lines) is equal to or greater than the predetermined threshold value (YES in step #41), it is determined that the image is a color image (step #42).

Then, the image forming instructing section 337 instructs the image forming section 2 to perform color printing (first printing processing) of the image determined as a color image. On the other hand, the image forming instructing section 337 instructs the image forming section 2 to perform monochromatic printing (secondary printing processing) of the image determined as a monochromatic image, not a color image.

Figure 4:
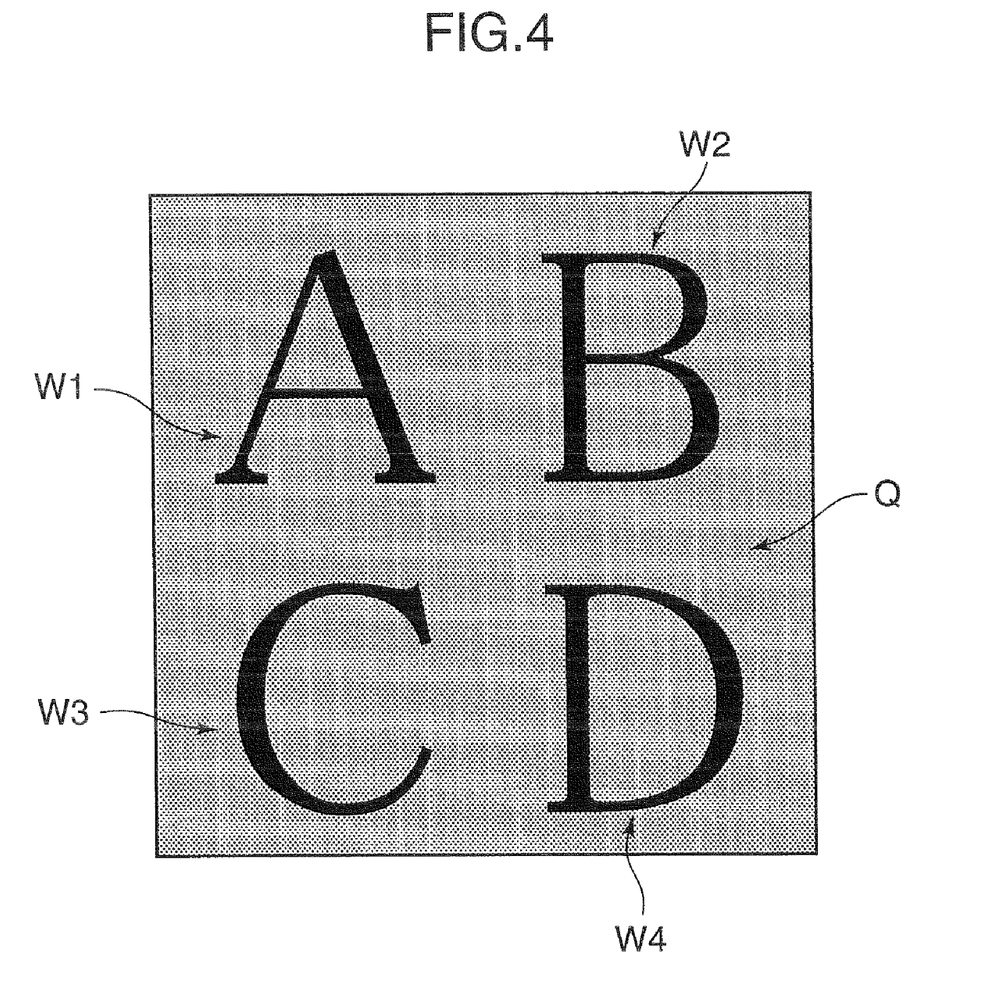
FIG. 4 shows an example of a document having a colored base portion.

As described above, in the present embodiment, it is so configured that a color to be excluded from the subject of the ACS processing can be inputted in the base color input screen G1. Accordingly, the ACS processing can be executed in a manner desired by a user. Consequently, for example, as shown in FIG. 4, in the case of a document on which characters or drawing is depicted in black on a document having a base of a chromatic color, a user can allow the copying machine 1 to execute the ACS processing with respect to only pixel data of pixels corresponding to character areas W1-W4 other than the base portion Q, as the subject of the determination, so that it can reduce likelihood of performing color printing for a user who thinks monochromatic printing is acceptable.

In place of the embodiment, or in addition to the embodiment, the following modifications can be adopted.

[1] In the embodiment, a suitable printing type is selected from among color printing (full color printing) and monochromatic printing. However, alternative of the printing type is not limited to this configuration. For example, two-color printing may be adopted in place of the full-color printing.

[2] In the embodiment, the RGB are set as the reference color components, and the processing in the flowcharts shown in FIGS. 6-9 are executed with use of image data of the reference color components of R (red), G (green), and B (blue). However, complementary colors of C (cyan), M (magenta), and Y (yellow), or Y (brightness signal), U (color difference signal (Cb)), and V (color difference signal (Cr)) may be set as the reference color components, and processing similar to the processing shown in FIGS. 6-9 may be executed with use of image data of the complementary colors. Further, the ACS processing shown in FIGS. 7-9 is an example, and other ACS processing may be adopted.

[3] In the base color input screen G1, it may be so configured as to be capable of inputting values of color expressed in values.

[4] In the embodiment, the copying machine 1 is provided with the display controller 331, the input reception section 332, the color data storage 333, the data obtaining section 334, the extraction section 335, and the ACS processing section 336. However, for example, the present invention also includes a configuration of providing the components 331-336 to an electronic equipment such as a personal computer, allowing the electronic equipment to serve as an image processing apparatus for executing the processing of the components 331-336, and allowing the image forming apparatus such as a copying machine or a complex machine 1 to perform image forming operation based on a processing result of the ACS processing executed by the image processing apparatus.

[5] The ACS processing is not limited to the processing shown in the flowcharts of FIGS. 7-9, and it may be other processing.

In summary, An image processing apparatus in accordance with an aspect of the present invention includes: an image forming instructing section which notifies an image forming section, which is capable of performing a first printing processing of performing image forming with use of a plurality of colors including at least one chromatic color and a second printing processing of performing image forming with use of only black color, a printing type processing requested to be performed among the first printing processing and the second printing processing; a data obtaining section which obtains pixel data from a plurality of pixels constituting an image; an operating section for inputting designated color data indicating color; a pixel data extracting section which extracts pixel data of colors, except for a designated color indicated by the designated color data inputted through the operating section, from pixel data obtained by the data obtaining section; and a printing type selecting section which selects a printing type from among the first printing processing and the second printing processing based on each pixel data extracted by the pixel data extracting section. The image forming instructing section notifies the printing type selected by the printing type selecting section as the type of printing processing requested to be performed.

According to this configuration, there are provided an operating section for inputting designated color data indicating color, a pixel data extracting section which extracts pixel data of colors except for a designated color indicated by the designated color data inputted through the operating section, from pixel data obtained by the data obtaining section, and a printing type selecting section which selects a printing type from among the first printing processing and the second printing processing based on each pixel data extracted by the pixel data extracting section, and the image forming instructing section notifies the printing type selected by the printing type selecting section as the type of printing processing requested to be performed. Accordingly, in the event of determining a printing type based on each pixel data, a user can select a color which is not to be included in the subject of the determination. Consequently, it becomes easy to execute the selection processing in a manner desired by a user.

Further, it is preferable that the designated color data and pixel data for each pixel are constituted by color component data associated with a plurality of reference color components, and that the pixel data extracting section executes processing of comparing the designated color data and the pixel data obtained by the data obtaining section for each pixel based on each reference color component, and extracts pixel data of a pixel, in which a reference color component is absent which has color component data having difference with respect to color component data of the designated color data within a predetermined range, from among the pixel data obtained by the data obtaining section.

According to this configuration, a pixel in which a reference color component is absent which has color component data having difference with respect to color component data of the designated color data within a predetermined range is determined as having color which is the same as or close to the color indicated by the designated color data and excluded from the subject of determination for determining the printing type.

Further, it is preferable that the printing type selecting section (1) determines, for each pixel of the pixel data extracted by the pixel data extracting section, that the pixel is a color pixel if at least one of differences among color component data of the pixel is greater than a predetermined threshold value, and (2) determines, for each pixel line corresponding to a scanning line of the image, if the number of color pixels belonging to the pixel line is equal to or greater than a predetermined threshold value, and (3) determines that the image is a color image if the number of color pixel lines having the number of color pixels equal to or greater than the predetermined threshold value is equal to or greater than a predetermined threshold value, and (4) selects the first printing processing as the printing type.

According to this configuration, the printing type selecting section determines that the pixel is a color pixel if at least one of differences among color component data of the pixel is greater than a predetermined threshold value. Therefore, the determination as to whether a pixel is a color pixel can be executed for each pixel. Next, the printing type selecting section determines that a pixel line in which the number of color pixels belonging to the pixel line is greater than the predetermined threshold value is a color pixel line. Therefore, it is determined whether a pixel line is a color pixel line for each pixel line. Then, if the number of color pixel lines is equal to or greater than the predetermined threshold value, the printing type selecting section determines that the image is a color image. Therefore, it can be determined whether the image is a color image on a basis of each image. Further, if the image is a color image, the first printing processing is selected as the printing type, and the image forming instructing section notifies that the type of printing processing to be performed by the image forming section is the first printing processing. Consequently, image forming of a color image can be performed with use of a plurality of colors including at least one chromatic color image.

Further, it is preferable that the operating section includes: a display section which displays an image; and a touch panel which is formed to be integral with the display section and outputs a detection signal indicating a touch position if a user touches the display section, and the image processing apparatus further comprises: a display controller which controls the display section to display a plurality of colors as selection candidate colors in a selectable manner, and if a detection signal indicating a position of any of the plurality of the selection candidate colors displayed on the display section is outputted by the touch panel, the display controller obtaining the selection candidate color displayed on the position indicated by the detection signal as the designated color.

According to this configuration, a plurality of colors are displayed on the display section as selection candidate colors in a selectable manner. If a user touches the selection candidate color displayed on the display section, the display controller obtains the touched selection candidate color as a designated color. Therefore, operability at a time when a user sets a designated color is improved.

Further, it is preferable that the display controller controls the display section to display the color obtained as the designated color as a temporarily set color, and controls the display section to display a button for receiving an instruction of fixing the designated color, and if a detection signal indicating a position of the button displayed on the display section is outputted by the touch panel, the temporarily set color is fixed as the designated color, and that the pixel data extracting section uses data indicating the designated color fixed by the display controller as the designated color data.

According to this configuration, the display controller controls the display section to display a color obtained as a designated color as a temporarily set color. Accordingly, a user can confirm a color selected as a designated color, thus operability improves. Further, if a user touches a button displayed on the display section, the color displayed on the display section as a temporarily set color is fixed as a designated color. Therefore, a user can fix the designated color after confirming the temporarily set color displayed on the display section. Accordingly, operability improves.

Further, it is preferable that the display controller controls the display section to display a predetermined number of colorless boxes at a time of displaying the plurality of selection candidate colors, and when displaying the temporarily set color on the display section, a color of the box is changed to the temporarily set color to display the temporarily set color.

According to this configuration, if the number of boxes to be displayed on the display section is, for example, set in advance to be the number which can be easily confirmed due to the limitation in the size of the display screen of the display section, colorless boxes are displayed on the display section by the number which can be additionally set as designated colors. Therefore, it becomes easy for a user to visually recognize the number of designated colors which can be additionally set.

Further, it is preferable that when a detection signal indicating a display position of a selection candidate color different from the temporarily set color displayed on the display section is outputted by the touch panel, the display controller changes the colorless box displayed on the display section to be a new temporarily designated color corresponding to the selection candidate color displayed at the position indicated by the detection signal.

According to this configuration, only if a selection candidate color which is different from a temporarily set color already displayed on the is selected, a colorless box is changed to the selected selection candidate color. Therefore, it can prevent the situation of displaying the same colors in duplicate in the boxes of the predetermined numbers and reduction in kinds of colors which can be set as the designated color.

Further, according to another aspect of the present invention, an image forming apparatus includes: the image processing apparatus mentioned above; and an image forming section which performs image forming operation in accordance with a type of the printing processing notified by the image forming instructing section.

According to this configuration, the effect mentioned above can be achieved in an image forming apparatus capable of performing first printing of performing image forming with use of a plurality of colors including at least one chromatic color and second printing of performing image forming with use of only black color.

As described above, in the event of determining the printing type based on each pixel data, a user can select a color which is not to be included as the subject of the determination, selection processing of the printing type is easily performed in a manner desired by a user.

This application is based on Japanese Patent application serial No. 2008-131860 filed in Japan Patent Office on May 20, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus, comprising:
   an image forming instructing section which notifies an image forming section, which is capable of performing a first printing processing of performing image forming with use of a plurality of colors including at least one chromatic color and a second printing processing of performing image forming with use of only black color, a printing type processing requested to be performed among the first printing processing and the second printing processing;
   a data obtaining section which obtains pixel data from a plurality of pixels constituting an image;
   an operating section for inputting designated color data indicating color;
   a pixel data extracting section which extracts pixel data of colors, except for a designated color indicated by the designated color data inputted through the operating section, from pixel data obtained by the data obtaining section; and
   a printing type selecting section which selects a printing type from among the first printing processing and the second printing processing based on each pixel data extracted by the pixel data extracting section, wherein
   the image forming instructing section notifies the printing type selected by the printing type selecting section as the type of printing processing requested to be performed.

2. The image processing apparatus according to claim 1, wherein
   the designated color data and pixel data for each pixel are constituted by color component data associated with a plurality of reference color components, and
   the pixel data extracting section executes processing of comparing the designated color data and the pixel data obtained by the data obtaining section for each pixel based on each reference color component, and extracts pixel data of a pixel, in which a reference color component is absent which has color component data having difference with respect to color component data of the designated color data within a predetermined range, from among the pixel data obtained by the data obtaining section.

3. The image processing apparatus according to claim 2, wherein
   the printing type selecting section (1) determines, for each pixel of the pixel data extracted by the pixel data extracting section, that the pixel is a color pixel if at least one of differences among color component data of the pixel is greater than a predetermined threshold value, and (2) determines, for each pixel line corresponding to a scanning line of the image, if the number of color pixels belonging to the pixel line is equal to or greater than a predetermined threshold value, and (3) determines that the image is a color image if the number of color pixel lines having the number of color pixels equal to or greater than the predetermined threshold value is equal to or greater than a predetermined threshold value, and (4) selects the first printing processing as the printing type.

4. The image processing apparatus according to claim 1, wherein
   the operating section includes:
   a display section which displays an image; and
   a touch panel which is formed to be integral with the display section and outputs a detection signal indicating a touch position if a user touches the display section, and
   the image processing apparatus further comprises:
   a display controller which controls the display section to display a plurality of colors as selection candidate colors in a selectable manner, and if a detection signal indicating a position of any of the plurality of the selection candidate colors displayed on the display section is outputted by the touch panel, the display controller obtaining the selection candidate color displayed on the position indicated by the detection signal as the designated color.

5. The image processing apparatus according to claim 4, wherein
   the display controller controls the display section to display the color obtained as the designated color as a temporarily set color, and controls the display section to display a button for receiving an instruction of fixing the designated color, and if a detection signal indicating a position of the button displayed on the display section is outputted by the touch panel, the temporarily set color is fixed as the designated color, and the pixel data extracting section uses data indicating the designated color fixed by the display controller as the designated color data.

6. The image processing apparatus according to claim 5, wherein the display controller controls the display section to display a predetermined number of colorless boxes at a time of displaying the plurality of selection candidate colors, and when displaying the temporarily set color on the display section, a color of the box is changed to the temporarily set color to display the temporarily set color.

7. The image processing apparatus according to claim 6, wherein when a detection signal indicating a display position of a selection candidate color different from the temporarily set color displayed on the display section is outputted by the touch panel, the display controller changes the colorless box displayed on the display section to be a new temporarily designated color corresponding to the selection candidate color displayed at the position indicated by the detection signal.

8. An image forming apparatus, comprising:

the image processing apparatus according to claim 1; and an image forming section which performs image forming operation in accordance with a type of the printing processing notified by the image forming instructing section.

* * * * *